(12) United States Patent
Kim et al.

(10) Patent No.: US 10,528,183 B2
(45) Date of Patent: Jan. 7, 2020

(54) TOUCH DISPLAY DEVICE

(71) Applicant: LG Display Co., Ltd., Seoul (KR)

(72) Inventors: Min-Ki Kim, Daegu (KR); Jin-Sung Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 11 days.

(21) Appl. No.: 16/115,497

(22) Filed: Aug. 28, 2018

(65) Prior Publication Data

US 2019/0129564 A1    May 2, 2019

(30) Foreign Application Priority Data

Oct. 31, 2017  (KR) .................. 10-2017-0143425

(51) Int. Cl.

| | | |
|---|---|---|
| *G06F 3/041* | (2006.01) | |
| *G09G 3/36* | (2006.01) | |
| *G06F 3/044* | (2006.01) | |

(52) U.S. Cl.
CPC .......... *G06F 3/0416* (2013.01); *G06F 3/0412* (2013.01); *G09G 3/3677* (2013.01); *G09G 3/3688* (2013.01); *G06F 3/044* (2013.01); *G09G 2310/08* (2013.01)

(58) Field of Classification Search
CPC .. G06F 3/0412; G06F 3/0416; G06F 3/04166; G06F 3/044; G06F 3/0443; G09G 3/3611; G09G 3/3666; G09G 3/3677; G09G 3/3688; G09G 2310/08; G09G 2320/0223; G09G 2365/00
See application file for complete search history.

(56) References Cited

U.S. PATENT DOCUMENTS

| | | | | |
|---|---|---|---|---|
| 2018/0120994 | A1* | 5/2018 | Yoo | G06F 3/0412 |
| 2018/0275827 | A1* | 9/2018 | Lin | G06F 1/3262 |
| 2018/0329570 | A1* | 11/2018 | Chan | G06F 3/0418 |
| 2018/0356932 | A1* | 12/2018 | Shepelev | G06F 3/0412 |
| 2019/0073085 | A1* | 3/2019 | Zhang | G06F 3/0418 |
| 2019/0114029 | A1* | 4/2019 | Mizuhashi | G02F 1/13306 |
| 2019/0121180 | A1* | 4/2019 | Ohashi | G02F 1/1339 |
| 2019/0278455 | A1* | 9/2019 | Li | G09G 3/3648 |

* cited by examiner

*Primary Examiner* — Ryan A Lubit
(74) *Attorney, Agent, or Firm* — Fenwick & West LLP

(57) ABSTRACT

The present disclosure relates to a touch display device capable of adaptively controlling a touch sensing period and a data writing period for each area according to whether touch has occurred. A timing controller in a touch display device time-divides each frame into a plurality of unit periods using a touch synchronization signal, time-divides each unit period into a data writing period in which one of a plurality of pixel blocks of a pixel array is scanned and a touch sensing period in which one of a plurality of touch blocks of a touch electrode array is scanned, receives touch coordinate information from an MCU, defines a panel as a touched area and an untouched area, and controls a first touch sensing period in which the touched area is scanned to increase to be longer than a second touch sensing period in which the untouched area is scanned.

14 Claims, 6 Drawing Sheets

TOUCH DISPLAY DEVICE

CROSS-REFERENCE TO RELATED APPLICATION(S)

This application claims the benefit of Korean Patent Application No. 10-2017-0143425, filed on Oct. 31, 2017, which is hereby incorporated by reference as if fully set forth herein.

BACKGROUND

Technical Field

The present disclosure relates to a touch display device capable of adaptively controlling a touch sensing period and a data writing period for each area according to whether touch has occurred.

Description of the Related Art

A touch sensor capable of inputting information through touch applied to a display screen is applied to various displays such as notebook computers, monitors and home appliances as well as portable information devices such as smartphones.

Touch techniques applies to displays include an add-on type in which a touch panel is attached to a display panel and an in-cell type in which touch electrodes are embedded in a display panel. The in-cell type is evolving into an advanced in-cell touch (AIT) type in which a common electrode of a liquid crystal display is split and used as touch electrodes.

An AIT display device time-divides each frame period into a plurality of data writing periods (or display periods) in which a pixel array is divided and driven and a plurality of touch sensing periods in which a touch electrode array is divided and driven and drives a touch display panel such that each data writing period and each touch sensing period alternate.

Since a data writing period and a touch sensing period obtained by time-dividing each frame have a trade-off relationship therebetween, the data writing period is relatively reduced and thus a data charging time may decrease when operation focuses on securing a touch sensing time, whereas the touch sensing period is relatively reduced and thus a touch sensing time may decrease when operation focuses on securing a data charging time. The ratio of data writing periods to touch sensing periods is fixed to a specific value by a touch synchronization signal in each frame.

Although the number of scan lines increases as the definition of the AIT display device increases, it is difficult to increase the data writing period for securing the touch sensing period. Accordingly, display performance deteriorates due to an insufficient data charging time.

BRIEF SUMMARY

In various embodiments, the present disclosure provides a touch display device capable of adaptively controlling a touch sensing period and a data writing period for each area according to whether touch has occurred.

A touch display device according to an embodiment includes: a panel including a pixel array and a touch electrode array including a plurality of touch electrodes included in the pixel array; a touch/data driver for driving data lines and the touch electrodes of the panel, reading out capacitance variations in the touch electrodes and outputting sensing data; a gate driver for driving gate lines of the panel; a timing controller for controlling display operations of the touch/data driver and the gate driver; and an MCU for controlling a touch sensing operation of the touch/data driver, receiving the sensing data from the touch/data driver to generate touch coordinate information and providing the touch coordinate information. The timing controller time-divides each frame into a plurality of unit periods using a touch synchronization signal, and time-divides each unit period into a data writing period in which one of a plurality of pixel blocks of the pixel array is scanned and a touch sensing period in which one of a plurality of touch blocks of the touch electrode array is scanned. The timing controller receives the touch coordinate information from the MCU, defines the panel as a touched area and an untouched area, and controls a first touch sensing period in which the touched area is scanned to increase to be longer than a second touch sensing period in which the untouched area is scanned.

The timing controller may control a second data writing period belonging to a second unit period including the second touch sensing period in which the untouched area is scanned to increase to be longer than a first data writing period belonging to a first unit period including the first touch sensing period in which the touched area is scanned.

The timing controller may control the first touch sensing period and the first data writing period to be identical in the first unit period and control the second data writing period to be longer than the second touch sensing period in the second unit period while maintaining the first unit period and the second unit period.

The touch/data driver may provide a data signal to the data lines and provide a common voltage to the touch electrodes through routing lines in each data writing period, and provide a touch driving signal having an AC waveform to the data lines and the routing lines in each touch sensing period. The gate driver may provide a scan signal and a gate off voltage to corresponding gate lines in each data writing period and provide a gate off modulation signal in an AC waveform having the same phase and the same amplitude as those of the touch driving signal to the gate lines in each touch sensing period.

In another embodiment, a touch display device comprises a panel including a pixel array and a plurality of touch electrodes included in the pixel array; a gate driver for driving gate lines of the panel; a touch/data driver for driving data lines and the touch electrodes of the panel in a plurality of unit periods of a frame period, each of the unit periods including one or more data writing periods and one or more touch driving periods alternating with the data writing periods, the touch/data driver providing a common voltage to the touch electrodes in the data writing periods and providing a touch driving signal to the touch electrodes in the touch driving periods; a timing controller controlling the touch/data driver such that a first relative length of a first aggregate touch sensing period of the touch sensing periods to a first aggregate data writing period of the data writing periods in a first unit period when the gate driver drives the gate lines in a first area of the panel is longer than a second relative length of a second aggregate touch sensing period of the touch sensing periods to a second aggregate data writing period of the data writing periods in a second unit period when the gate driver drives the gate lines in a second area of the panel. The first area of the panel may be a touched area and the second area of the panel is an untouched area excluding the touched area. The first unit period and the second unit period are of a same duration. In one embodiment, the first relative length is 5/5 and the second relative length is 4/6.

In still another embodiment, a method of operating a touch display device is provided, the touch display device comprising a panel including a pixel array and a plurality of touch electrodes included in the pixel array, a gate driver for driving gate lines of the panel, a touch/data driver for driving data lines and the touch electrodes of the panel in a plurality of unit periods of a frame period, each of the unit periods including one or more data writing periods and one or more touch driving periods alternating with the data writing periods, the method comprising providing a common voltage to the touch electrodes in the data writing periods; and providing a touch driving signal to the touch electrodes in the touch driving periods, wherein a first relative length of a first aggregate touch sensing period of the touch sensing periods to a first aggregate data writing period of the data writing periods in a first unit period when the gate driver drives the gate lines in a first area of the panel is longer than a second relative length of a second aggregate touch sensing period of the touch sensing periods to a second aggregate data writing period of the data writing periods in a second unit period when the gate driver drives the gate lines in a second area of the panel.

DETAILED DESCRIPTION

Hereinafter, preferred embodiments of the present disclosure will be described with reference to the attached drawings.

Figure 1:
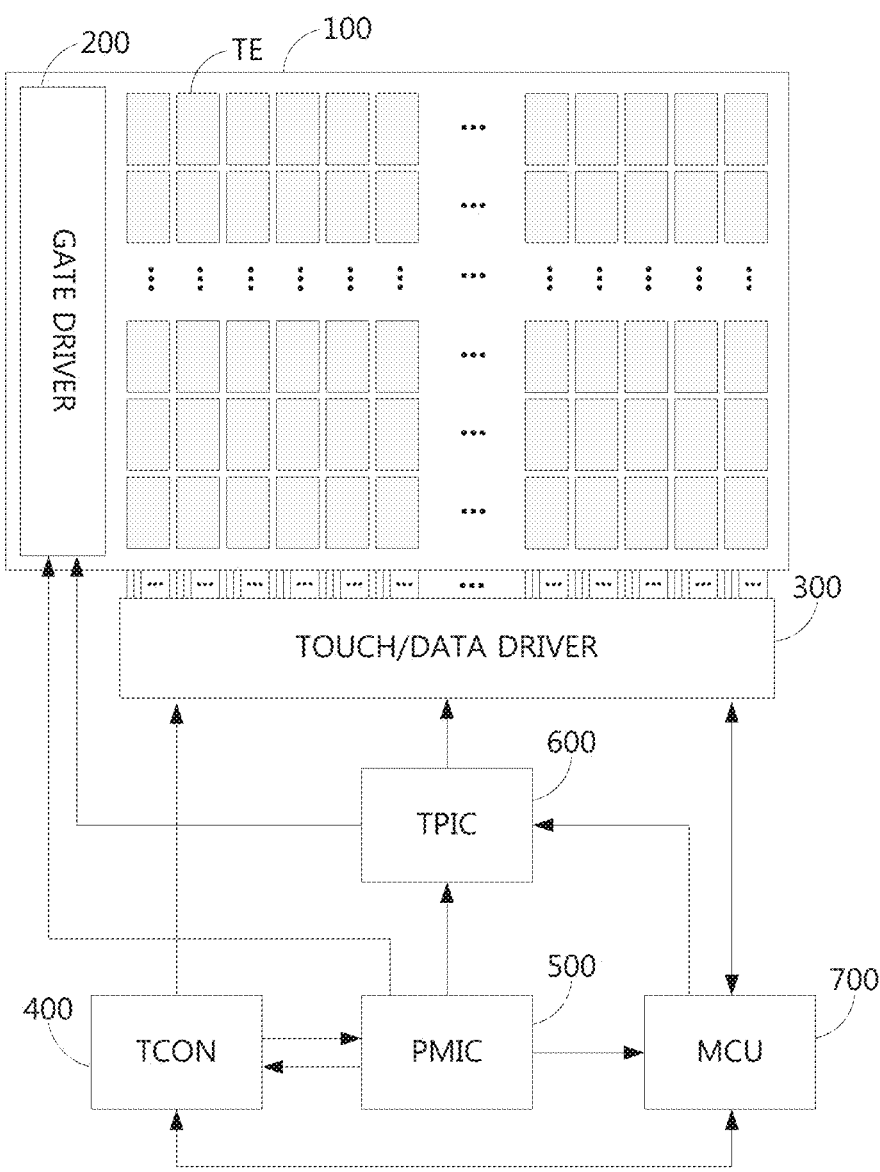
FIG. 1 is a block diagram schematically illustrating a configuration of a touch display device according to an embodiment of the present disclosure.
Figure 2:
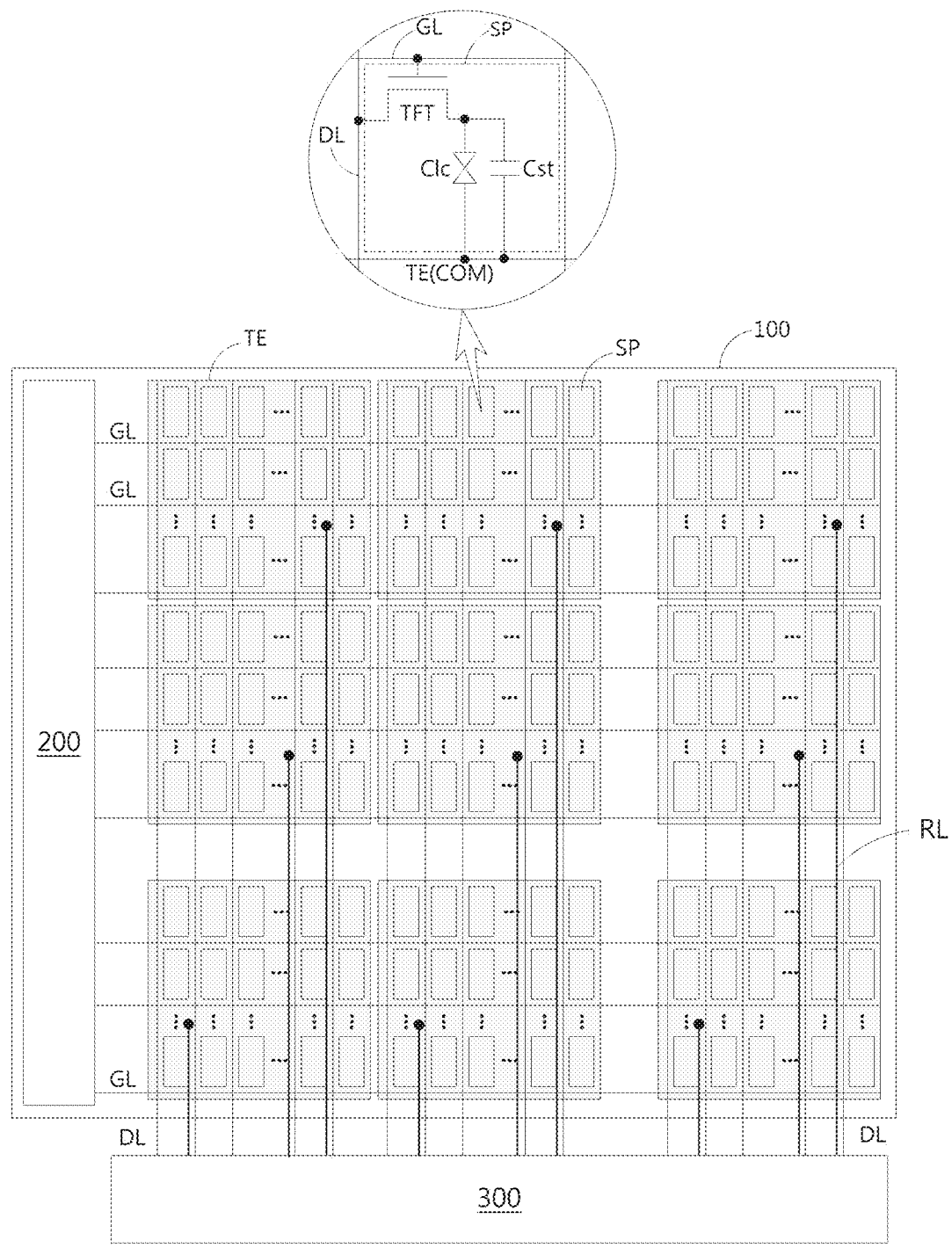
FIG. 2 is a diagram illustrating configurations of touch electrodes and sub-pixels in the touch display panel according to an embodiment of the present disclosure.
Figure 3:
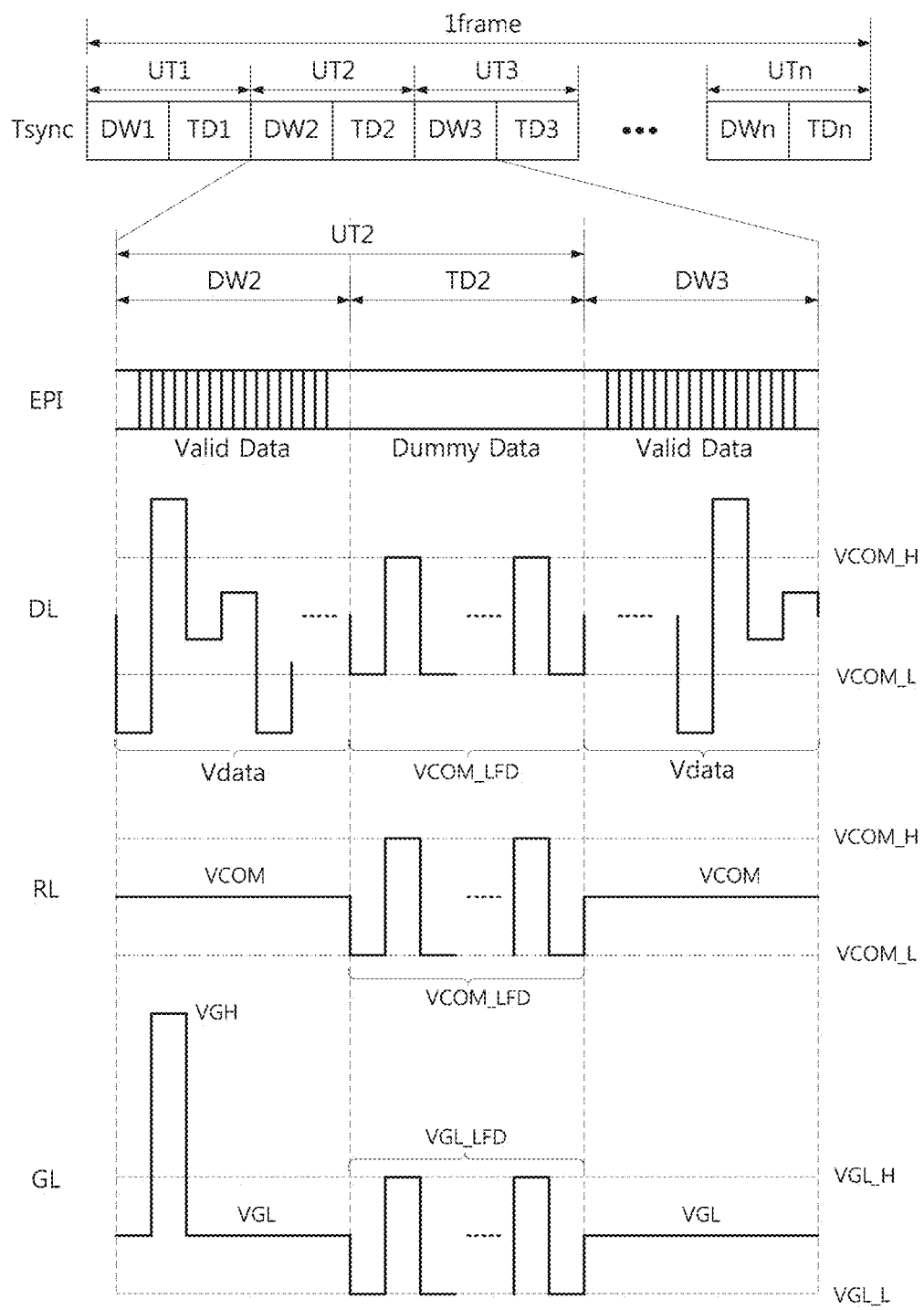
FIG. 3 is a driving waveform diagram of the touch display device according to an embodiment of the present disclosure.

FIG. 1 is a block diagram schematically illustrating a configuration of a touch display device according to an embodiment. FIG. 2 is a diagram illustrating configurations of touch electrodes and sub-pixels in the touch display panel according to an embodiment. FIG. 3 is a driving waveform diagram of the touch display device according to an embodiment.

Referring to FIG. 1, the touch display device includes a panel 100, a gate driver 200, a touch/data driver 300, a timing controller (TCON) 400, a power management integrated circuit (PMIC) 500, a touch power integrated circuit (TPIC) 600, and a microcontroller unit (MCU) 700.

The panel 100 has a touch sensing function and a display function. The panel 100 displays an image through a pixel array in which sub-pixels are arranged in a matrix. The panel 100 senses touch through a capacitive touch sensing method using a touch electrode array in which touch electrodes TE included in the pixel array and used as a common electrode are arranged in a matrix. One of a mutual capacitance touch sensing method and a self-capacitance touch sensing method may be used as the capacitive touch sensing method. In embodiments of the present invention, the self-capacitance touch sensing method is exemplified.

The panel 100 displays an image through sub-pixels SP arranged in a matrix, as illustrated in FIG. 2. A base pixel may be composed of at least three sub-pixels among white (W), red (R), green (G) and blue (B) sub-pixels, which can express white by mixing colors. For example, the base pixel may be composed of R/G/B sub-pixels, W/R/G sub-pixels, B/W/R sub-pixels, G/B/W sub-pixels or W/R/G/B sub-pixels.

Each sub-pixel SP includes a thin film transistor TFT connected to a gate line GL and a data line DL, a liquid crystal capacitor Clc connected to the thin film transistor TFT and a touch electrode TE which is a common electrode COM, and a storage capacitor Cst. The liquid crystal capacitor Clc charges a difference voltage between a data signal supplied to a pixel electrode through the thin film transistor TFT and a common voltage supplied to the touch electrode TE and drives liquid crystal according to the charged voltage to control light transmissivity. The storage capacitor Cst stably maintains the voltage charged in the liquid crystal capacitor Clc.

The panel 100 includes a touch electrode array composed of touch electrodes TE functioning as a common electrode and a touch sensor. As illustrated in FIG. 2, the touch electrode array includes a plurality of touch electrode columns, and each touch electrode column includes a plurality of touch electrodes TE arranged in the direction of data lines DL and a plurality of routing lines RL which individually connects the touch electrodes TE to the touch/data driver 300. The plurality of touch electrodes TE are obtained by dividing a common electrode positioned in the pixel array into a plurality of segments and each touch electrode TE is formed in a predetermined size including a plurality of sub-pixels SP in consideration of a touch point size. Each touch electrode TE is connected to a plurality of sub-pixels SP overlapping therewith and forms a single touch sensor.

The PMIC 500 receives an input voltage, generates a plurality of driving voltages necessary for the touch display device and provides the driving voltages. The PMIC 500 may generate and provide a plurality of driving voltages necessary for the TPIC 600, the TCON 400, the MCU 700, the gate driver 200 and the touch/data driver 300 using the input voltage. For example, the PMIC 500 may generate a digital circuit driving voltage, provide the digital circuit driving voltage to each driving circuit, generate an analog circuit driving voltage and provide the analog circuit driving voltage to the TPIC 600 and the touch/data driver 300. The PMIC 500 may generate and provide driving voltages necessary for the gate driver 200. The PMIC 500 may generate a gate off voltage VGL and a common voltage VCOM and provide the same to the TPIC 600.

In addition, the PMIC 500 may include a level shifter, receive simple timing signals including an on-clock signal, an off-clock signal, a start signal and the like from the TCON 400, generate a plurality of gate control signals and provide the gate control signals to the gate driver 200. For example, the PMIC 500 generates a plurality of clock signals having different rising timings synchronized with the on-clock signal supplied from the TCON 400 and different falling timings synchronized with the off-clock signal supplied from the TCON 400, outputs the clock signals to the gate driver 200, level-shifts the start signal, a reset signal and the like supplied from the TCON 400 and outputs the level-shifted signals to the gate driver 200.

The TPIC 600 receives the output voltage of the PMIC 500 and control signals of the MCU 700, generates a plurality of driving signals necessary for driving circuits related to touch driving and sensing operations, such as the gate driver 200 and the touch/data driver 300, and outputs the driving signals.

For example, in each data writing period DW under the control of the MCU 700 as illustrated in FIG. 3, the TPIC 600 provides the common voltage VCOM supplied from the PMIC 500 to the touch/data driver 300 and provides the gate off voltage VGL to the gate driver 200.

In each touch sensing period TD under the control of the MCU 700 as illustrated in FIG. 3, the TPIC 600 generates a touch driving signal VCOM_LFD and a gate off modulation signal VGL_LFD which have the same phase and the same amplitude and respectively provides the touch driving signal VCOM_LFD and the gate off modulation signal VGL_LFD to the touch/data driver 300 and the gate driver 200.

In each touch sensing period TD, the TPIC 600 generates the touch driving signal VCOM_LFD having an AC waveform in which a common high voltage VCOM_H and a common low voltage VCOM_L periodically alternate, and provides the touch driving signal VCOM_LFD to the touch/data driver 300. In each touch sensing period TD, the TPIC 600 generates the gate off modulation signal VGL_LFD having an AC waveform in which a gate off high voltage VGL_H and a gate off low voltage VGL_L periodically alternate, and provides the gate off modulation signal VGL_LFD to the gate driver 200. The TPIC 600 may be provided with the common voltage VCOM and the gate off voltage VGL from the PMIC 500 and use the common high voltage VCOM_H, the common low voltage VCOM_L, the gate off high voltage VGL_H and the gate off low voltage VGL_L by converting digital data stored in an internal memory into analog voltages.

The TCON 400 is provided with image data and timing signals from a host system. The timing signals include a dot clock signal, a data enable signal, a vertical synchronization signal and a horizontal synchronization signal. The host system may be one of a computer, a TV system, a set-top box, and a system of a mobile terminal such as a tablet and a mobile phone.

The TCON 400 generates data control signals for controlling operation timing of the touch/data driver 300 using the timing signals supplied from the host system and timing information stored in an internal register and provides the data control signals to the touch/data driver 300. For example, the data control signals include a source start pulse signal and a source sampling clock signal used to control data latch timing, a source output enable signal for controlling data output timing, a polarity control signal for controlling the polarity of a data signal, and the like.

The TCON 400 generates simple timing signals, such as an on-clock signal, an off-clock signal and a start signal, used to generate gate control signals in the level shifter included in the PMIC 500 using timing signals supplied from the host system and the timing information stored in the internal register and provides the simple timing signals to the PMIC 500.

The TCON 400 time-divides each frame into a plurality of data writing periods DW1 to DWn and a plurality of touch sensing periods TD1 to TDn using the timing signals supplied from the host system and the timing information stored in the internal register, as illustrated in FIG. 3, generates a touch synchronization signal Tsync in which each data writing period DW and each touch sensing period TD alternate and provides the touch synchronization signal Tsync to the MCU 700. In other words, each frame may be time-divided into a plurality of unit periods UT1 to UTn, and each unit period UT may be time-divided into one data writing period DW and one touch sensing period TD. The data writing period DW and the touch sensing period TD may be controlled in each unit period UT according to variation in the touch synchronization signal Tsync. Each data writing period DW refers to a period in which image data is charged (written) to sub-pixels of a corresponding pixel block in the panel 100, and each touch sensing period TD refers to a period in which the touch driving signal VCOM_LFD is applied to each touch electrode TE while touch electrodes TE of a corresponding touch block are scanned and capacitance variations in the corresponding touch electrodes TE are read out to sense whether touch has occurred.

The TCON 400 may receive touch coordinate information from the MCU 700 and adaptively control each data writing period DW and each touch sensing period TD for each area according to whether touch has occurred. For example, the TCON 400 may improve touch sensing performance by relatively increasing the touch sensing period TD for a touched area in which touch has occurred and improve display performance by relatively increasing the data writing period DW to secure a data charging time for an untouched area in which touch does not occur. This will be described in detail later.

The TCON 400 performs various image processes for picture quality compensation and power consumption reduction on image data received from the system and stores the image data in a memory. The TCON 400 reads image data of a corresponding pixel block from the memory at a higher reading rate than a writing rate in each data writing period DW and provides display information including the image data and data control signals to the touch/data driver 300.

The TCON 400 and the touch/data driver 300 transmit and receive data using one of various interfaces. For example, the TCON 400 uses an embedded point-to-point interface (EPI) which converts various types of control information and image data into a serial form including a clock signal and transmits the same in units of a packet in a point-to-point manner.

The TCON 400 converts the display information including the control information and the image data into an EPI packet including a clock signal and transmits the EPI packet to the touch/data driver 300 through a transmission line pair. The EPI packet includes a clock training pattern for internal clock locking of the touch/data driver 300, an align training pattern, a control packet including a clock signal and data control information in a serial form, a data packet including a clock signal and image (pixel) data in a serial form, and the like. The TCON 400 may output dummy data to the touch/data driver 300 in each touch sensing period TD.

The touch/data driver 300 restores display information such as the clock signal, control information and image data from the EPI packet supplied from the TCON 400, converts the image data into an analog data signal Vdata using a plurality of gamma voltages and provides the analog data signal Vdata to the data lines DL of the panel 100 in each data writing period DW. The touch/data driver 300 supplies the common voltage VCOM provided from the TPIC 600 to the touch electrodes TE through the routing lines RL such that the touch electrodes TE serve as a common electrode in each data writing period DW.

The touch/data driver 300 provides the touch driving signal VCOM_LFD provided from the TPIC 600 to touch electrodes TE of a corresponding block through routing lines RL of the corresponding block and, simultaneously, provides the touch driving signal VCOM_LFD to the data lines DL in each touch sensing period TD.

The touch/data driver 300 includes a read-out circuit, supplies the touch driving signal VCOM_LFD to touch electrodes TE of a corresponding block through the routing lines RL, and then reads out a signal fed back from each touch electrode TE through an individual routing line RL in each touch sensing period TD. The touch/data driver 300 differentially amplifies the touch driving signal VCOM_LFD and the read-out signal with respect to each touch electrode TE to sense self-capacitance variation (a signal delay amount) in each touch electrode TE due to touch, generates sensing data (touch sensing information) through signal processing and provides the sensing data to the MCU 700.

The touch/data driver 300 may be composed of a plurality of touch/data ICs, and each touch/data IC may be mounted on a circuit film such as a chip on film (COF) and bonded to the panel 100 through tape automatic bonding (TAB) or mounted on the panel 100 in the manner of a chip on glass (COG).

The gate driver 200 receives a plurality of gate control signals and driving voltages from the PMIC 500 and receives gate off signals including the gate off voltage VGL and the gate off modulation signal VGL_LFD from the TPIC 600. The gate driver 200 generates scan pulses according to the gate control signals to individually drive the gate lines GL in each data writing period DW. The gate driver 200 supplies scan pulses of a gate on voltage VGH to each gate line GL in each driving period of each gate line GL and supplies the gate off voltage VGL to each gate line GL in a non-driving period of each gate line GL according to the gate control signals supplied from the PMIC 500 in each data writing period DW.

The gate driver 200 supplies the gate off modulation signal VGL_LFD supplied from the TPIC 600 to the gate lines GL in each touch sensing period TD.

The gate driver 200 may be embedded as a gate-in-panel (GIP) type in a non-active area of the panel 100 by being formed on a substrate along with a thin film transistor array which constitutes the pixel array PA of the panel 100. The GIP type gate driver 200 may be disposed on one side or both sides of the panel 100. The gate driver 200 may be composed of a plurality of gate ICs, and each gate IC may be mounted on a circuit film such as a COF and bonded to the panel 100 through TAB or mounted on the panel 100 in the manner of a COG.

The MCU 700 receives the touch synchronization signal Tsync from the TCON 400, generates a plurality of timing control signals necessary for touch sensing and provides the timing control signals to the touch/data driver 300 and the TPIC 600. The MCU 700 receives touch sensing information from the touch/data driver 300, generates touch coordinates at which touch has occurred and provides the touch coordinates to the host system and the TCON 400. The touch/data driver 300 and the MCU 700 may share touch sensing information through serial peripheral interface (SPI) communication. The MCU 700 and the TCON 400 may share touch sensing information through SPI communication.

Referring to FIG. 3, each frame includes a plurality of data writing periods DW1 to DWn in which the pixel array of the panel 100 is time-divided into a plurality of pixel blocks and driven according to the touch synchronization signal Tsync and a plurality of touch sensing periods TD1 to TDn in which the touch electrode array of the panel 100 is time-divided into a plurality of touch blocks and driven. That is, each of a plurality of unit periods UT1 to UTn obtained by time-dividing each frame includes the data writing period DW in which a single pixel block is scanned and the touch sensing period TD in which a single touch block is scanned. The touch synchronization signal Tsync may vary the data writing period DW and the touch sensing period TD according to whether touch has occurred while maintaining each unit period UT. The size of each touch block scanned in each touch sensing period TD is greater than the size of each pixel block scanned in each data writing period DW. Accordingly, the pixel array is scanned once in the plurality of data writing periods DW1 to DWn whereas the touch electrode array may be scanned twice or more in the plurality of touch sensing periods TD1 to TDn in each frame.

In each data writing period DW, the touch/data driver 300 converts image data supplied from the TCON 400 into an analog data signal Vdata, provides the analog data signal Vdata to the data lines DL of the panel 100, and provides the common voltage VCOM supplied from the TPIC 600 to the touch electrodes TE through the routing lines RL. In each data writing period DW, the gate driver 200 sequentially drives gate lines GL of a corresponding pixel block using the gate control signals supplied from the PMIC 500 and the gate off voltage VGL supplied from the TPIC 600 such that image data supplied to the data lines DL is charged in each sub-pixel.

In each touch sensing period TD, the touch/data driver 300 provides the touch driving signal VCOM_LFD supplied from the TPIC 600 to routing lines RL of a corresponding touch block and to the data lines DL, and the gate driver 200 provides the gate off modulation signal VGL_LFD supplied from the TPIC 600 to the gate lines GL. In each touch sensing period TD, the touch/data driver 300 reads out capacitance variation in each touch electrode TE of the corresponding touch block through the routing lines RL, converts the capacitance variation into sensing data representing whether touch has occurred and provides the sensing data to the MCU 700.

The common high voltage VCOM_H used as the touch driving signal VCOM_LFD may be higher than the common voltage VCOM and the common low voltage VCOM_L may be lower than the common voltage VCOM. The common low voltage VCOM_L may be the same as the common voltage VCOM. The gate off high voltage VGL_H used as the gate off modulation signal VGL_LFD may be lower than the gate on voltage VGH and higher than the gate off voltage VGL, and the gate off low voltage VGL_L may be lower than the gate off voltage VGL. The gate off low voltage VGL_L may be the same as the gate off voltage VGL. The swing widths and pulse widths of the common high voltage VCOM_H and the common low voltage VCOM_L are identical to the swing widths and pulse widths of the gate off high voltage VGL_H and the gate off low voltage VGL_L.

In the touch sensing period TD, the touch driving signal VCOM_LFD supplied to the data lines DL and the touch electrodes TE of the panel 100 and the gate off modulation signal VGL_LFD supplied to the gate lines GL have the same phase and the same amplitude, and thus the touch electrodes TE can operate load-free. That is, initial capacitances between the touch electrodes TE and the gate lines GL and between the touch electrodes TE and the data lines DL in the panel 100 can be minimized according to load-free operation during the touch sensing period TD to minimize a resistance-capacitance (RC) load of the touch electrodes TE, thereby minimizing signal distortion due to the RC load and improving touch sensitivity.

The touch driving signal VCOM_LFD and the gate off modulation signal VGL_LFD may have various waveforms such as trapezoid waves and sine waves in addition to square waves shown in FIG. 3.

Figure 4:
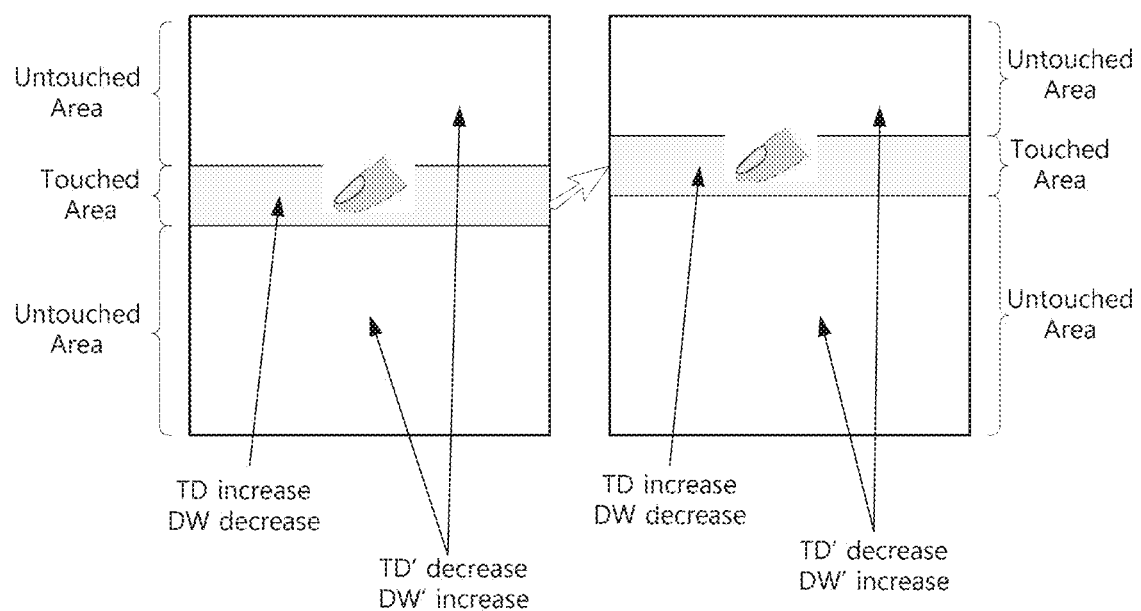
FIG. 4 is a schematic diagram illustrating an example of a touched area and an untouched area in the touch display device according to an embodiment of the present disclosure.

FIG. 4 is a schematic diagram illustrating an example of a touched area in which touch has occurred and an untouched area in which touch does not occur in the touch display device according to an embodiment of the present disclosure.

As illustrated in FIG. 4, when touch has occurred, the TCON 400 receives information on touch coordinates through the MCU 700, defines an area including the touch coordinates as a touched area and defines the remaining area as an untouched area. The touched area may be varied by tracking the touch coordinates which are variable.

The TCON 400 may control a touch sensing period TD in which the touched area is scanned to increase to be longer than another touch sensing period TD' in which the untouched area is scanned and control a data writing period DW in which the untouched area is scanned to increase to be longer than another data writing period (DW') in which the touched area is scanned.

Accordingly, the touch sensing period TD increases in the touched area and thus touch performance can be improved, whereas the data writing period DW increases in the untouched area and thus a data charging time can be secured, improving display performance.

Figure 5:
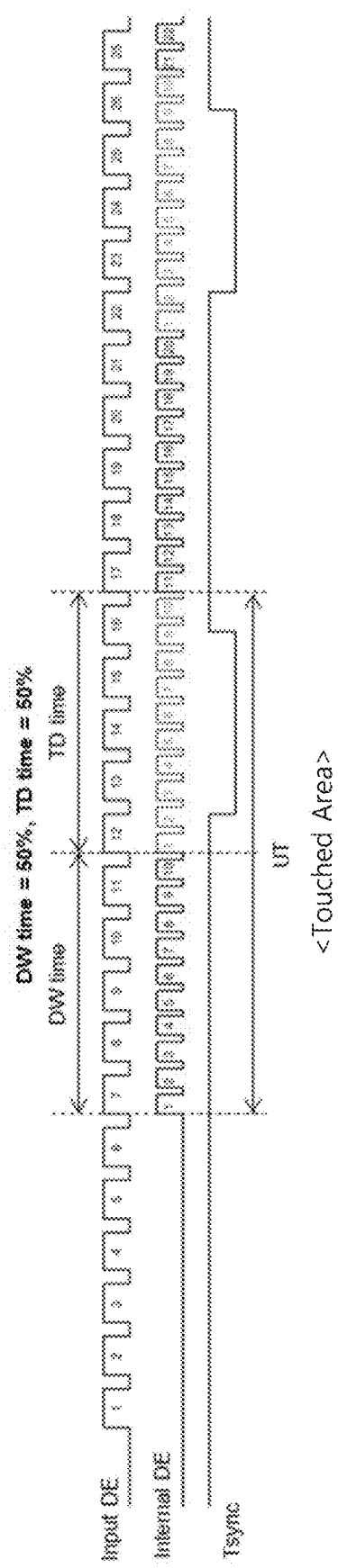
FIGS. 5 and 6 are timing diagrams illustrating a method of controlling a touch sensing period and a data writing period in the touch display device according to an embodiment of the present disclosure.
Figure 6:
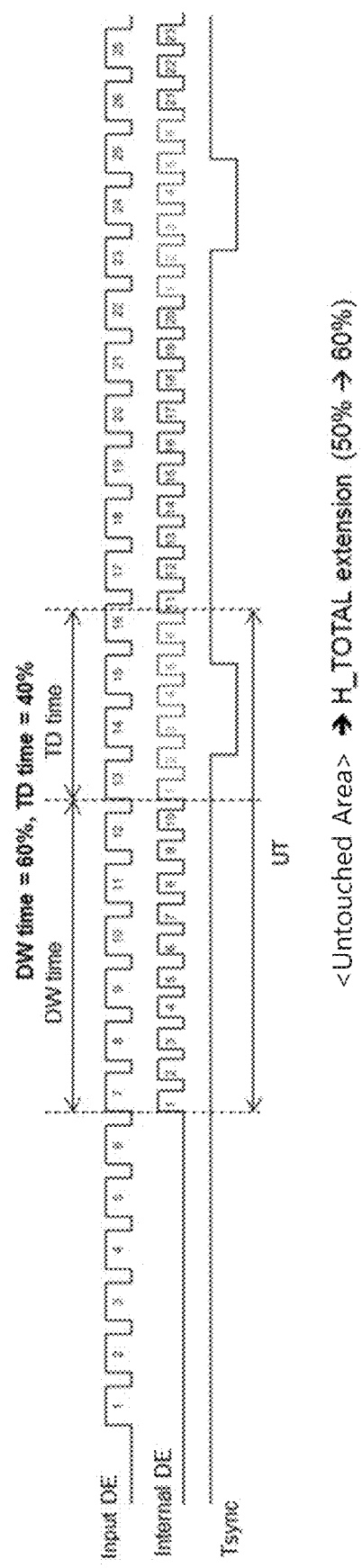

FIGS. 5 and 6 are timing diagrams illustrating a method of controlling a touch sensing period and a data writing period in the touch display device according to an embodiment.

The TCON 400 stores input image data in the memory in an enable period of an input data enable signal DE supplied from the host system, reads image data stored in the memory in an enable period of an internal data enable signal DE having a higher frequency than the input data enable signal DE, and transmits the read image data to the touch/data driver 300. Each period of the internal data enable signal DE in the data writing period DW corresponds to one horizontal period 1H in which data is written to sub-pixels of one horizontal line in the panel 100. The TCON 400 receives touch coordinates from the MCU 700, defines an area corresponding to the touch coordinates as a touched area and defines the remaining area as an untouched area.

Referring to FIGS. 5 and 6, the TCON 400 controls the touch synchronization signal Tsync in the touched area and the untouched area to adaptively adjust the data writing period DW and the touch sensing period TD in each unit period UT while maintaining each unit period UT.

For example, in a unit period UT including a touch sensing period TD in which the touched area is scanned, as shown in FIG. 5, it is possible to control the touch sensing period TD and the data writing period DW to have the same proportion (50%) by increasing the touch sensing period TD and decreasing the data writing period DW by the increment of the touch sensing period TD while maintaining the unit period UT.

For example, in a unit period UT including a touch sensing period TD in which the untouched area is scanned, as shown in FIG. 6, it is possible to control the proportion of the data writing period DW to be larger (60%) than the proportion (40%) of the touch sensing period TD by increasing the data writing period DW and decreasing the touch sensing period TD while maintaining the unit period UT.

The touch display device according to an embodiment can adaptively control a touch sensing period and a data writing period for each area according to whether touch has occurred.

The touch display device according to an embodiment can improve touch performance by relatively increasing the touch sensing period in an area in which touch has occurred and improve display performance by relatively increasing the data writing period to secure a data charging time in an area in which touch does not occur.

Accordingly, the touch sensing period TD increases in the touched area and thus touch performance can be improved, whereas the data writing period DW increases in the untouched area and thus a data charging time can be secured, improving display performance.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A touch display device comprising:
    a panel including a pixel array and a touch electrode array including a plurality of touch electrodes included in the pixel array;
    a touch/data driver for driving data lines and the touch electrodes of the panel, reading out capacitance variations in the touch electrodes and outputting sensing data;
    a gate driver for driving gate lines of the panel;
    a timing controller for controlling display operations of the touch/data driver and the gate driver; and
    an MCU for controlling a touch sensing operation of the touch/data driver, receiving the sensing data from the touch/data driver to generate touch coordinate information and providing the touch coordinate information,
    wherein the timing controller time-divides each frame into a plurality of unit periods using a touch synchronization signal, time-divides each unit period into a data writing period in which one of a plurality of pixel blocks of the pixel array is scanned and a touch sensing period in which one of a plurality of touch blocks of the touch electrode array is scanned, receives the touch coordinate information from the MCU, defines the panel as a touched area and an untouched area, and controls a first touch sensing period in which the touched area is scanned to increase to be longer than a second touch sensing period in which the untouched area is scanned.

2. The touch display device according to claim 1, wherein the timing controller controls a second data writing period belonging to a second unit period including the second touch sensing period in which the untouched area is scanned to increase to be longer than a first data writing period belonging to a first unit period including the first touch sensing period in which the touched area is scanned.

3. The touch display device according to claim 2, wherein the timing controller controls the first touch sensing period and the first data writing period to be identical in the first unit period and controls the second data writing period to be longer than the second touch sensing period in the second unit period while maintaining the first unit period and the second unit period.

4. The touch display device according to claim 1, wherein the touch/data driver provides a data signal to the data lines and provides a common voltage to the touch electrodes through routing lines in each data writing period, and provides a touch driving signal having an AC waveform to the data lines and the routing lines in each touch sensing period, and the gate driver provides a scan signal and a gate off voltage to corresponding gate lines in each data writing period and provides a gate off modulation signal in an AC waveform having the same phase and the same amplitude as those of the touch driving signal to the gate lines in each touch sensing period.

5. A touch display device comprising:
a panel including a pixel array and a plurality of touch electrodes included in the pixel array;
a gate driver for driving gate lines of the panel;
a touch/data driver for driving data lines and the touch electrodes of the panel in a plurality of unit periods of a frame period, each of the unit periods including one or more data writing periods and one or more touch driving periods alternating with the data writing periods, the touch/data driver providing a common voltage to the touch electrodes in the data writing periods and providing a touch driving signal to the touch electrodes in the touch driving periods;
a timing controller controlling the touch/data driver such that a first relative length of a first aggregate touch sensing period of the touch sensing periods to a first aggregate data writing period of the data writing periods in a first unit period when the gate driver drives the gate lines in a first area of the panel is longer than a second relative length of a second aggregate touch sensing period of the touch sensing periods to a second aggregate data writing period of the data writing periods in a second unit period when the gate driver drives the gate lines in a second area of the panel,
wherein the first area of the panel is a touched area and the second area of the panel is an untouched area excluding the touched area.

6. The touch display device of claim 5, wherein the first unit period and the second unit period are of a same duration.

7. The touch display of claim 5, wherein the first relative length has a 5:5 ratio and the second relative length has a 4:6 ratio.

8. The touch display device of claim 5, wherein the gate driver provides a scan signal and a gate off voltage to corresponding gate lines in the data writing periods and provides a gate off modulation signal having a same phase and a same amplitude swing as those of the touch driving signal to the gate lines in the touch sensing periods.

9. The touch display device of claim 5, wherein the touch/data driver provides the touch drive signal to the data lines in the touch driving periods.

10. A method of operating a touch display device including a panel including a pixel array and a plurality of touch electrodes included in the pixel array, a gate driver for driving gate lines of the panel, a touch/data driver for driving data lines and the touch electrodes of the panel in a plurality of unit periods of a frame period, each of the unit periods including one or more data writing periods and one or more touch driving periods alternating with the data writing periods, the method comprising:
providing a common voltage to the touch electrodes in the data writing periods; and
providing a touch driving signal to the touch electrodes in the touch driving periods,
wherein a first relative length of a first aggregate touch sensing period of the touch sensing periods to a first aggregate data writing period of the data writing periods in a first unit period when the gate driver drives the gate lines in a first area of the panel is longer than a second relative length of a second aggregate touch sensing period of the touch sensing periods to a second aggregate data writing period of the data writing periods in a second unit period when the gate driver drives the gate lines in a second area of the panel,
wherein the first area of the panel is a touched area and the second area of the panel is an untouched area excluding the touched area.

11. The method of claim 10, wherein the first unit period and the second unit period are of a same duration.

12. The touch display of claim 10, wherein the first relative length has a 5:5 ratio and the second relative length has a 4:6 ratio.

13. The method of claim 10, wherein the gate driver provides a scan signal and a gate off voltage to corresponding gate lines in the data writing periods and provides a gate off modulation signal having a same phase and a same amplitude swing as those of the touch driving signal to the gate lines in the touch sensing periods.

14. The method of claim 10, wherein the touch/data driver provides the touch drive signal to the data lines in the touch driving periods.

* * * * *